United States Patent [19]
Arai et al.

[11] Patent Number: 4,967,438
[45] Date of Patent: Nov. 6, 1990

[54] CONNECTING MEMBER IN WINDSHIED WIPER

[75] Inventors: Masaru Arai; Itsuro Saita, both of Yono, Japan

[73] Assignee: Nippon Wiperblade Co., Ltd., Saitama, Japan

[21] Appl. No.: 396,216

[22] Filed: Aug. 21, 1989

[30] Foreign Application Priority Data

Aug. 22, 1988 [JP] Japan .................. 63-109055[U]

[51] Int. Cl.⁵ .............................................. B60S 1/40
[52] U.S. Cl. ................................ 15/250.32; 403/329; 403/363
[58] Field of Search ................. 15/250.37–250.35, 15/250.42; 403/329, 363

[56] References Cited

FOREIGN PATENT DOCUMENTS

| | | |
|---|---|---|
| 2415180 | 10/1975 | Fed. Rep. of Germany ... 15/250.32 |
| 2557281 | 6/1977 | Fed. Rep. of Germany ......... 16/38 |
| 2035065 | 6/1978 | Fed. Rep. of Germany ... 15/250.32 |
| 2709893 | 9/1978 | Fed. Rep. of Germany ... 15/250.32 |
| 2470034 | 6/1981 | France ............................. 15/250.32 |
| 2597050 | 10/1987 | France ............................. 15/250.32 |
| 609287 | 2/1978 | Switzerland .................... 15/250.32 |

Primary Examiner—Harvey C. Hornsby
Assistant Examiner—Joseph S. Machuga
Attorney, Agent, or Firm—Wenderoth, Lind & Ponack

[57] ABSTRACT

A windshield wiper of the type including a wiper arm having a U-shaped tip end, a wiper blade having a primary lever which has spaced parallel side walls on the lengthwise central portion and a pin extending between the side walls, and a connecting member for connecting the wiper arm with the primary lever and including a main body having a generally U-shaped outer surface corresponding to the U-shaped tip end of the wiper arm, a generally cylindrical bore for rotatably engaging with the pin of the primary lever, and flange portions for slidably engaging with the side walls of the primary lever. The connecting member is formed of two halves being split along a plane perpendicular to the pin of the primary lever, and the flange portions of respective halves for slidably engaging with the side walls of the primary lever are projecting toward side walls of the primary lever at the opposite ends in the lengthwise direction of the primary lever as compared with the lengthwise central portions.

14 Claims, 2 Drawing Sheets

CONNECTING MEMBER IN WINDSHIED WIPER

FIELD OF THE INVENTION

This invention relates to a windshield wiper for use in a vehicle such as an automobile and, particularly, to a connecting member in the windshield wiper which connects a wiper arm having a U-shaped end with a primary lever of a wiperblade.

DESCRIPTION OF PRIOR ART

A wiper arm having a U-shaped tip end is publicly known and, typically, as shown in FIGS. 4 and 5, a wiper arm 1 (only the tip end portion is shown in the drawings) has a generally U-shaped tip end 1a and an opening 2 in one leg of the U-shaped portion. The wiper arm 1 is detachably connected to a wiperblade 3 (only the central portion is shown in the drawings) of a wiper through a connecting member 7. The connecting member 7 includes a generally cylindrical portion 9 being adapted to be rotatably assembled with a pin 6 of the wiperblade through a cutout 8, an extending portion extending from the cylindrical portion for defining together with the cylindrical portion a generally U-shaped outer surface complementary with the generally U-shaped inner surface of the tip end 1a of the wiper arm 1, flange portions 10 and 11 for slidably engaging with and being received between opposite side walls 4 and 5 of the wiperblade 3, and a projection 12 formed on the extending portion of the connecting member 7 for engaging with the opening 2 in the U-shaped tip end 1a of the wiper arm 1.

In such prior art device, there are shortcomings such that there is sometimes excessive clearance between opposite outer surfaces of the flanges 10 and 11 of the connecting member 7 and opposite side walls 4 and 5 of the wiperblade 3 due to the manufacturing tolerance and the like. It is possible to avoid such deficiency by manufacturing parts at a high accuracy which inevitably increases the cost.

The present invention aims to provide a connecting member in a windshield wiper avoiding the shortcomings aforementioned.

SUMMARY OF THE INVENTION

The present invention relates to a windshield wiper of the type including a wiper arm having a U-shaped tip end with an opening being formed in the lower leg of the U-shaped tip end, a wiper blade having a primary lever which has spaced parallel side walls on the lengthwise central portion and a pin extending between the side walls, and a connecting member for connecting the wiper arm with the primary lever and having a generally cylindrical connecting portion for rotatably engaging with the pin of the primary lever, flange portions for slidably engaging with side walls of the primary lever and a generally U-shaped outer surface portion corresponding to the U-shaped tip end of the wiper arm with a projection corresponding to the opening in the wiper arm being formed thereon. The connecting member according to the invention is formed of two halves being split along a plane perpendicular to said pin or generally along the widthwise central plane, and respective halves have flange portions for slidably abutting with the side walls of the primary lever on opposite ends in the lengthwise direction of the primary lever, said flange portions being projecting toward side walls of the primary lever as compared with the lengthwise central portion.

The flange portions can resiliently engage with the side walls of the primary lever such that it is possible to absorb any clearance between the connecting member and the primary lever in the widthwise direction of the primary lever.

Preferably, the generally U-shaped outer surface portion of the connecting member is adapted to engage resiliently with the inner surface of the generally U-shaped tip end of the wiper arm.

Preferably, a widthwise extending cutout is formed in the generally cylindrical portion of the connecting member for assembling the connecting member with the pin of the primary lever with the cutout being provided at the location near to the rear direction.

BRIEF DESCRIPTION OF THE DRAWINGS

Further objects and effects of the present invention will become apparent from the following detailed description in conjunction with the drawings, in which:

FIG. 4 is an exploded perspective view showing essential portions of prior art connecting member, wiper arm and wiperblade; and FIG. 5 is a partial sectional view showing the prior art connecting member, wiper arm and wiperblade of FIG. 4 in the assembled condition.

DETAILED DESCRIPTION OF PREFERRED EMBODIMENTS

Figure 1:
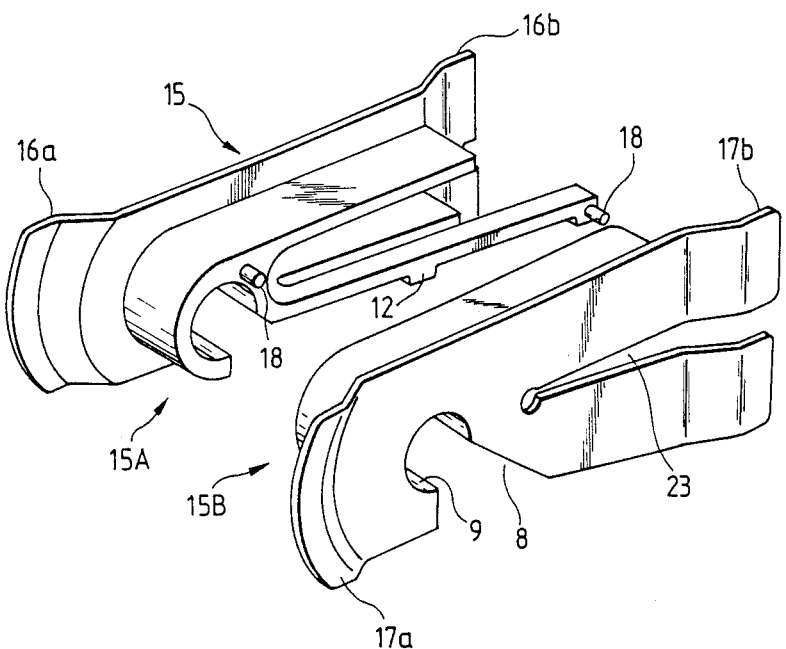
FIG. 1 is an exploded perspective view of a connecting member according to a first embodiment of the present invention.

FIG. 1 shows a connecting member 15 according to a first embodiment of the invention. The connecting member 15 consists of two halves 15A and 15B being formed by splitting along the widthwise central plane. There are formed on respective halves 15A and 15B flanges 16 and 17, the lengthwise opposite end portions 16a, 16b and 17a, 17b of which project toward corresponding side walls 4 and 5 of the primary lever 3 to which the flanges abut as compared with the lengthwise central portion. It will be understood that the wording "lengthwise" and "widthwise" are referred relative to the primary lever 3, such that the primary lever 3 has widthwise spaced side walls 4 and 5 on the lengthwise central portion.

To fittingly assemble the two halves 15A and 15B together, there are formed projection and recess fitting portions 18 and 18. (Only two projections are shown in FIG. 1 on the half 15A, and correspondingly shaped recess formed in the half 15B are not shown.) It will be understood that, in the embodiment, the projections are formed on one 15A of the two halves and the other 15B has only the recesses, but, it is possible to provide projections and recesses on both of two halves 15A and 15B.

Similar to the prior art device shown in FIGS. 4 and 5, there are provided widthwise extending cutouts 8 and generally cylindrical inner surface portions 9, however, according to the invention, the cutouts 8 extend in the inclined downward and rearward direction while the cutout 8 in the prior art extends in the downward direction. The construction of the invention provides for increased strength, rigidity and durability of the connecting member, particularly when a load acts on the connecting member in the downward direction during the operation of the wiperblade.

The flanges 16a, 16b and 17a, 17b of the connecting member 15 can resiliently engage with the inner surfaces of the side walls 4 and 5 of the primary lever 3 owing to their structural resiliency, thus, it is not required to provide a high accuracy in manufacturing the connecting member, thereby reducing the cost.

Figure 2:
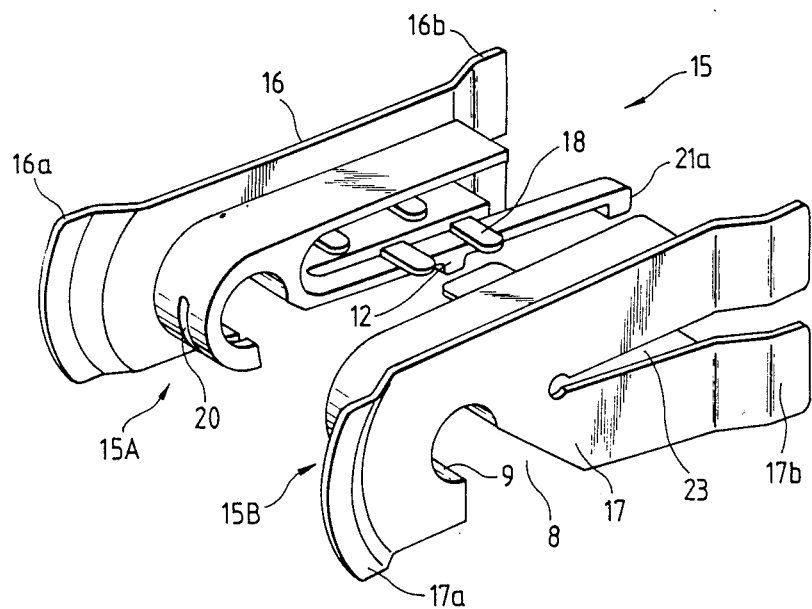
FIG. 2 is a view similar to FIG. 1, but showing a second embodiment of the present invention.

FIG. 2 shows a modified form, which differs from the connecting member of FIG. 1 in that the configuration of the projection and recess portions 18 is modified, and that a slit 20 is provided which provides for reduction of radial play between the pin 6 and the connecting member 15 and for play between the wiper arm and the connecting member.

In FIGS. 1 and 2, a slit 23 is formed in each of the flange portions 16b and 17b on the rear sides of the two halves 15A and 15B, and the slit 23 provides increased structural resiliency and further reduction in play between the connecting member and the primary lever.

Figure 3:
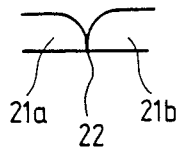
FIG. 3 is a partial view showing a modified form.
Figure 3:
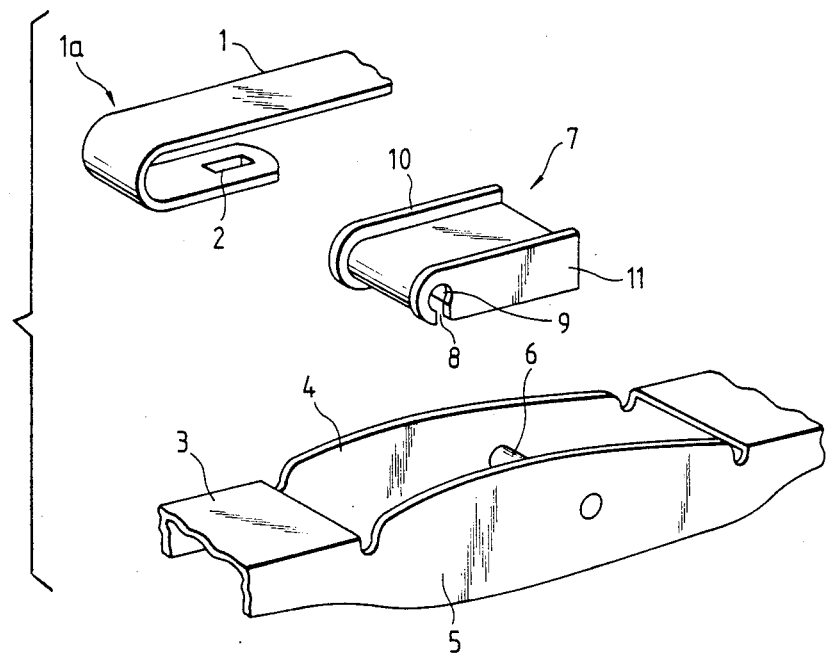
Figure 3:
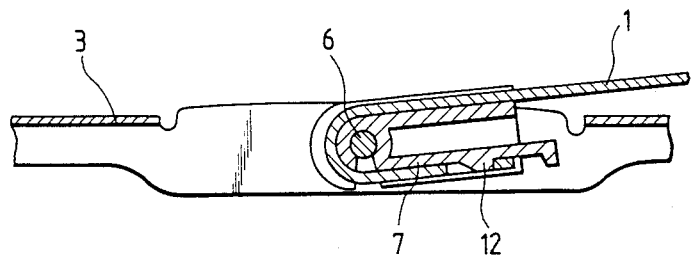

The two halves 15A and 15B of the connecting member 15 of FIGS. 1 and 2 are formed separately, however, it is possible to manufacture the two halves unitarily and, thereafter, to separate them and to assemble together. FIG. 3 shows an example forming the two halves unitarily. In FIG. 3, the tip end portions 21a and 21b of respective halves 15A and 15B of the connecting member 15 of FIG. 2 are connected together through a thin thickness portion 22 in die forming the member 15 unitarily and, thereafter, the two halves are separated by cutting the thin thickness portion 22 and are assembled together.

As shown in FIG. 2, the slit 20 formed in the half 15A such that a circumferential end of the cylindrical bore 9 defined between the bore 9 and the slot 8 and between the slit 20 and the widthwise inner end of the half 15A defines a diameter larger than that of the bore 9, so that the radial play between the wiper arm and the connecting member can further be reduced.

It will be understood that the invention is not limited to the embodiments shown in the drawings, and various changes or modifications may easily be applied for those skilled in the art within the scope of the present invention which is defined by the claims.

We claim:

1. In a windshield wiper of the type including a wiper arm having a U-shpaed tip end, a wiper blade having a primary lever which has spaced parallel side walls on a lengthwise central portion thereof and a pin extending between the side walls, and a connecting member for connecting the wiper arm with the primary lever and including a main body having lateral sides and having a generally U-shaped outer surface corresponding to the U-shaped tip end of the wiper arm, a generally cylindrical bore for rotatably engaging with the pin of the primary lever, and flange portions for slidably engaging with the side walls of the primary lever; characterized in that said connecting member is formed of two halves being split along a plane perpendicular to said pin, and that each of said flange portions of respective halves includes a first portion which is substantially coplanar to one of the lateral sides of said main body and a second portion which is laterally offset outward from said first portion.

2. A windshield wiper according to claim 1, wherein the generally U-shaped outer surface of the connecting member is slightly larger than that of the wiper arm.

3. A windshield wiper according to claim 1, wherein said second portion of the flange portions of the connecting member resiliently engage with the side walls of the primary lever.

4. A windshield wiper according to claim 1, wherein the connecting member has a widthwise extending slot for passing said pin therethrough in assembling the primary lever with the connecting member.

5. A windshield wiper according to claim 4, wherein the slot extends downwardly and rearwardly form said bore.

6. A windshield wiper according to claim 4, wherein one of said two halves of the main body of said connecting member has a portion adjacent said bore which has a greater widthwise dimension than the remaining portions adjacent said bore.

7. A windshield wiper according to claim 6, wherein
a longitudinally extending slot is formed in said one of said two halves of said main body of said connecting member from the outer surface through to said bore, one end of said longitudinally extending slot opening into said widthwise extending slot.

8. A windshield wiper according to claim 1, wherein the two halves of the connecting member are formed with the ends remote from the cylindrical bore portions connected together such that the two halves can be formed unitarily in producing the same.

9. A windshield wiper according to claim 1, wherein the two halves of the connecting member are connected together along mutually facing longitudinal edges.

10. A connecting member for use in connecting a windshield wiper arm with a U-shaped tip end to a windshield wiper blade primary lever having spaced apart parallel side walls and a pin extending thereacross, comprising:
a main body having lateral sides and having a generally U-shaped outer surface and a generally cylindrical bore formed widthwise through the main body; and
a flange connected to each lateral side of said main body, each said flange having a first portion which is substantially coplanar with each respective lateral side, a second portion at a forward longitudinal end of said main body which is offset laterally outwardly from said first portion and a third portion at a rearward longitudinal end of said main body which is offset laterally outwardly from said first portion.

11. A connecting member according to claim 10, wherein
said main body is formed of two separate halves connected together along a vertical longitudinal plane.

12. A connecting member according to claim 11, wherein
said main body has a first slot formed therein which extends laterally across said main body and extends downwardly and rearwardly from said cylindrical bore.

13. A connecting member according to claim 12, wherein
one of said two halves of said main body has a portion adjacent said bore which has a greater lateral dimension than do the remaining portions adjacent said bore.

14. A connecting member according to claim 12, wherein
said bore is formed at a forward portion of said main body; and
a longitudinally extending second slot is formed in said one of said two halves of said main body from said outer surface through to said cylindrical bore, one end of said longitudinally extending second slot opening into said first slot.

* * * * *